Nov. 16, 1954

W. W. DE LANO 2,694,570

METHOD OF AND MEANS FOR CONTINUOUSLY
STACKING ECHELON SHEETS

Filed April 12, 1951

INVENTOR.
WALTER W. De LANO
BY
J Warren Kinney Jr.
ATTORNEY

Nov. 16, 1954

W. W. DE LANO 2,694,570

METHOD OF AND MEANS FOR CONTINUOUSLY
STACKING ECHELON SHEETS

Filed April 12, 1951

INVENTOR.
WALTER W. De LANO

BY
Warren Kinney Jr.
ATTORNEY

Nov. 16, 1954
W. W. DE LANO
2,694,570
METHOD OF AND MEANS FOR CONTINUOUSLY
STACKING ECHELON SHEETS
Filed April 12, 1951
7 Sheets-Sheet 5
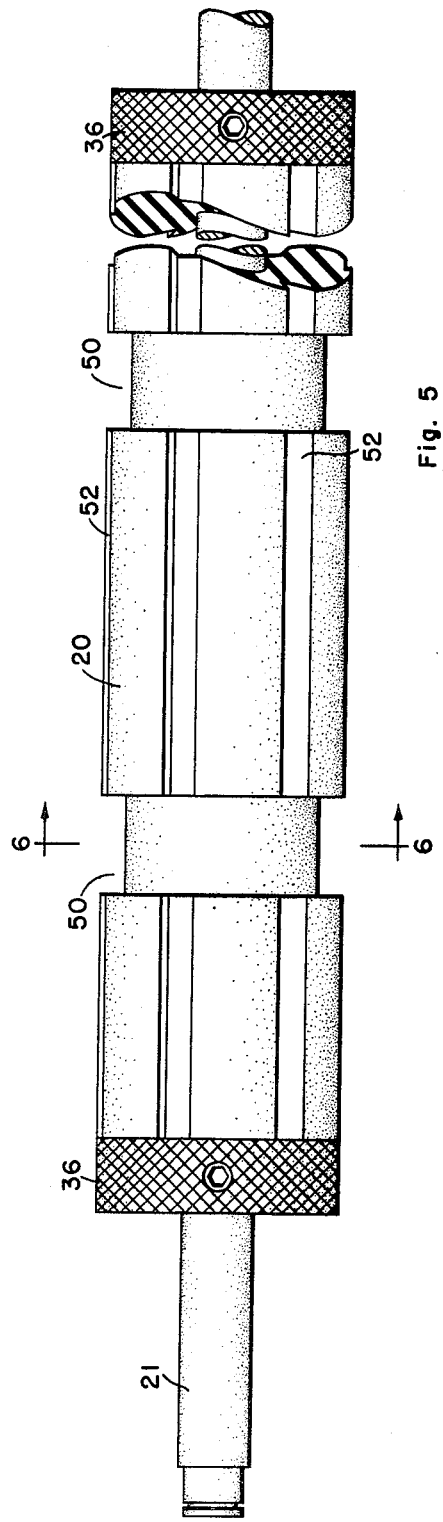
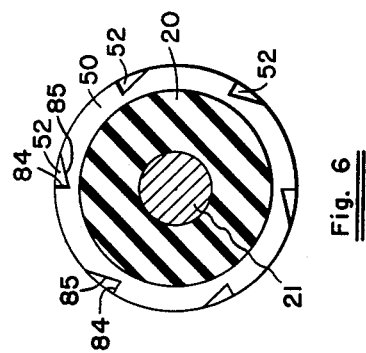
INVENTOR.
WALTER W. De LANO
BY
*J. Warren Kinney Jr.*
ATTORNEY United States Patent Office 2,694,570
Patented Nov. 16, 1954

2,694,570

METHOD OF AND MEANS FOR CONTINUOUSLY STACKING ECHELON SHEETS

Walter W. De Lano, Hamilton, Ohio, assignor to The Hamilton Tool Company, Hamilton, Ohio, a corporation of Ohio Application April 12, 1951, Serial No. 220,601

11 Claims. (Cl. 271—71)

This invention relates to a method of and means for slowing down and stacking the individual sheets severed by rotary cut-off means from a continuous strip or web of material moving at high linear speed.

An object of the invention is to provide a combination creeper delivery and sheet stacking device which is adapted to accommodate sheets of different widths and lengths, thereby greatly enhancing its utility.

Another object of the invention is to provide a high speed sheet stacking device capable of handling individual sheets of material severed by rotary cut-off means from a continuous strip of material moving at high linear speed, such as, by way of example, from a high speed rotary press, rewinding device, or the like, which device includes slow-down means for effectively retarding the linear speed of the sheets discharged from the rotary cut-off means and for accumulating said sheets in echelon relationship as they are conveyed to the sheet stacking portion of my device.

A further object of the invention is to provide a sheet stacker which includes a vertically shiftable platform upon which the severed sheets are accurately aligned and stacked and wherein the vertical movement of said platform is correlated with and controlled by the sheet material stacked thereon.

Still a further object of the invention is to provide a combination creeper delivery and stacker having the hereinabove described characteristics which is so constructed and arranged as to enable an operator to quickly adapt the device to accommodate sheets of different lengths and widths in a matter of seconds, and without requiring mechanical adjustments in the driving mechanism thereof.

Another object of the invention is to provide fully automatic means for obtaining accurate side and end alignment of the stacked sheets without requiring the use of bumpers or joggers.

Another object of the invention is to teach a method of effectively simultaneously accumulating and slowing down and then stacking the individual sheets severed by rotary cut-off means from a continuous strip of material moving at high linear speed.

These and other objects are attained by the means described herein and as disclosed in the accompanying drawings in which Fig. 1 is a perspective view of a combination high speed sheet cutting, slow-down and stacking device embodying the teachings of the present invention.

Fig. 5 is an enlarged detail view of the kick-off roll comprising a detail of the invention.

Fig. 6 is a view taken on line 6—6 of Fig. 5.

Figure 1:
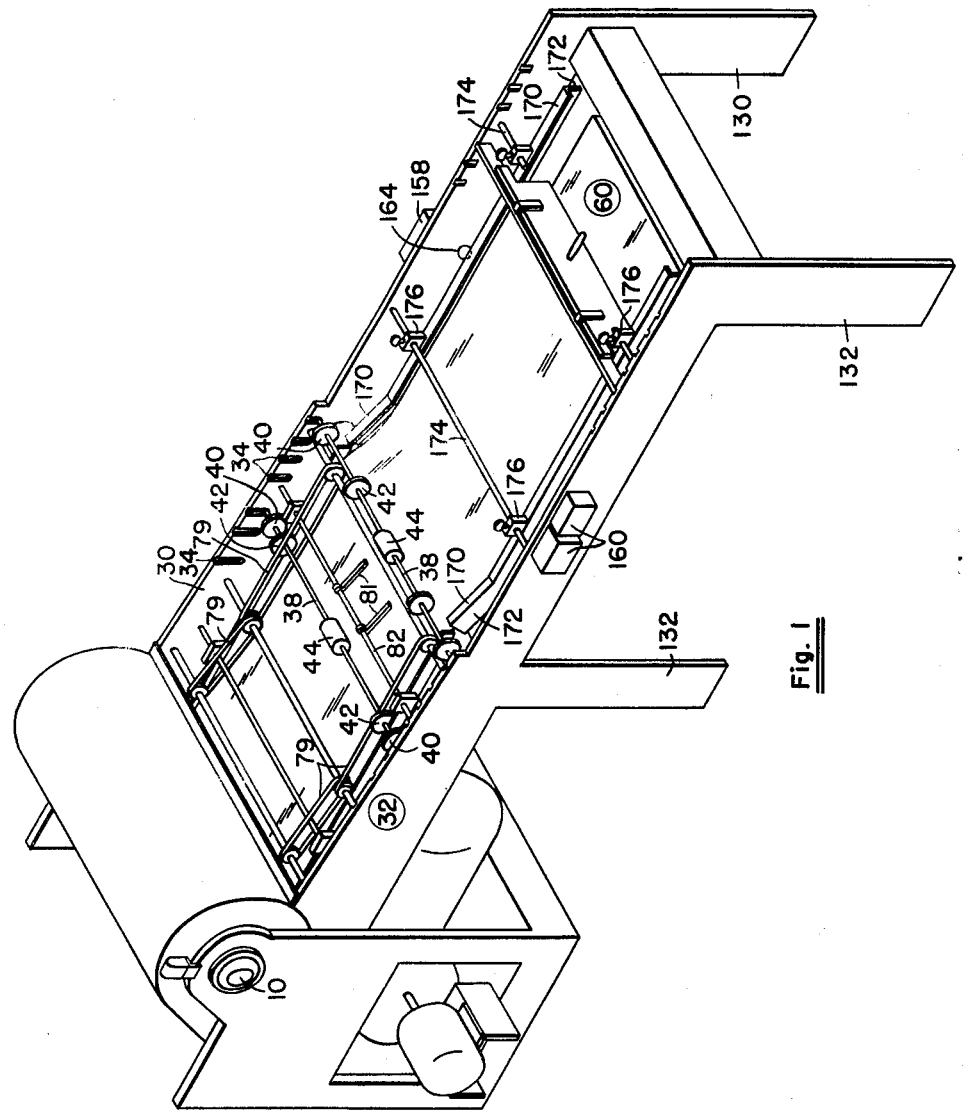
Figure 2:
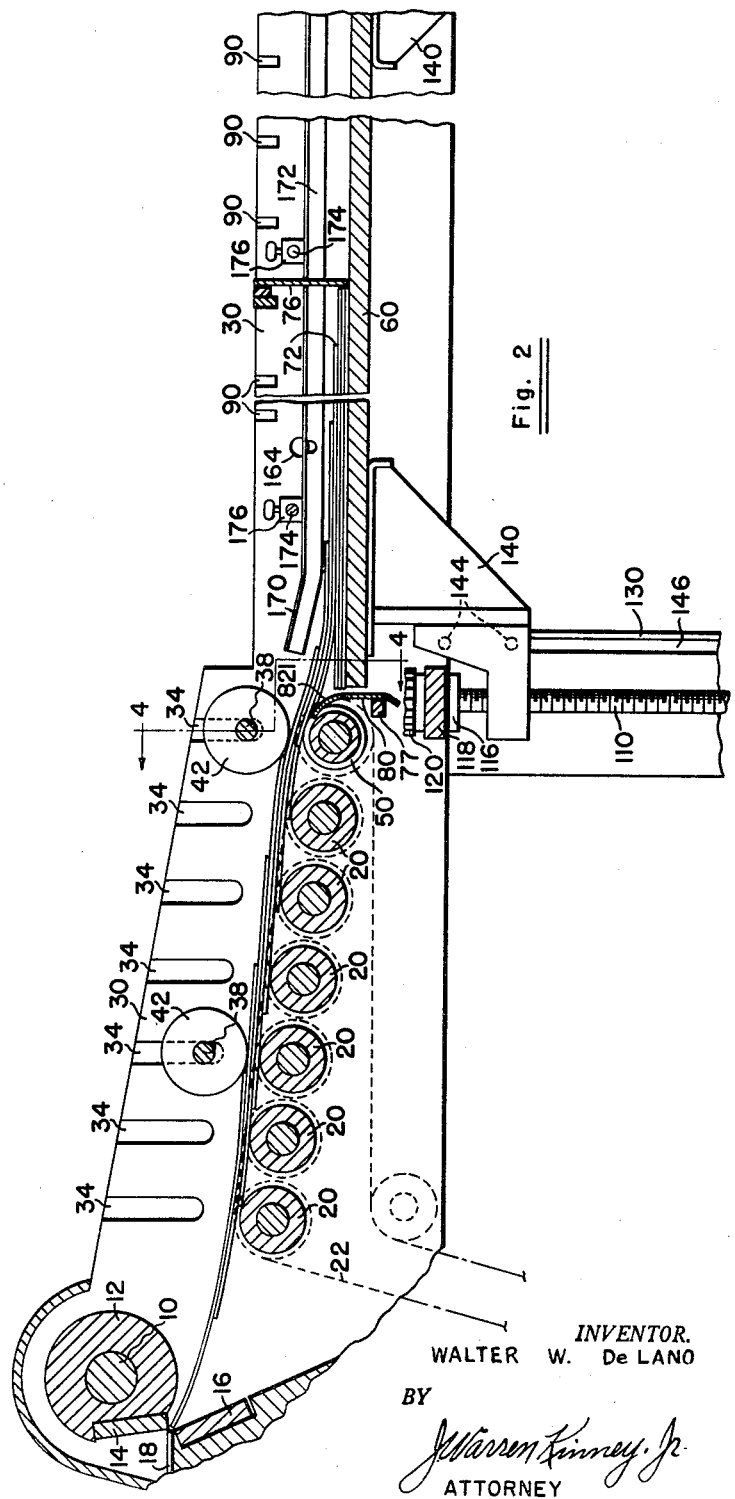
Fig. 2 is a longitudinal schematic view, partly in section, illustrating the relationship of certain of the sheet severing, feeding, slow-down and stacking elements of the device of Fig. 1.
Figure 3:
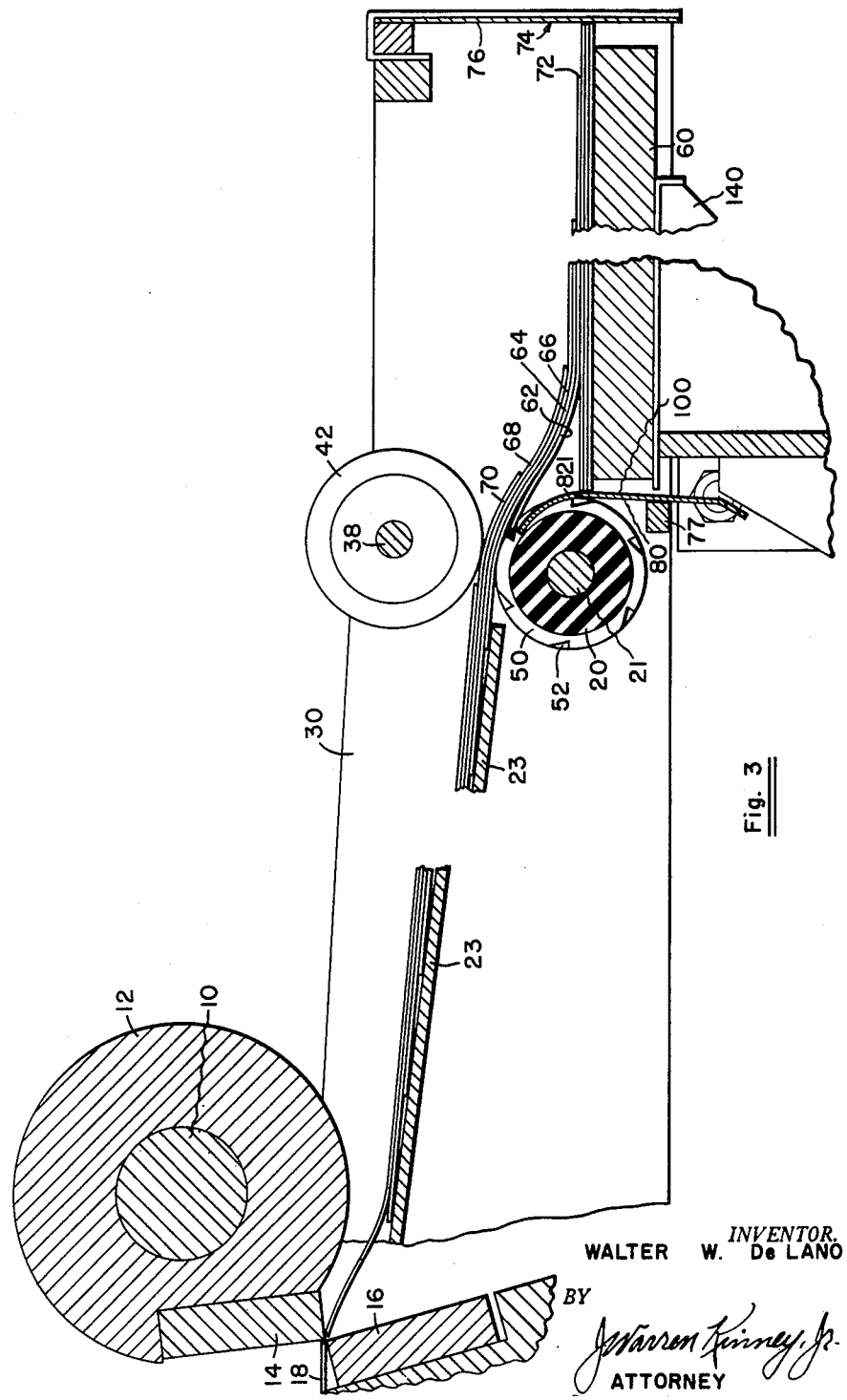
Fig. 3 is a side, partial, enlarged schematic view of a modified form of the device embodying the teachings of the present invention.

With reference now to Figs. 1, 2 and 3, the numeral 10 denotes the axial center of a rotary cut-off cylinder indicated generally by the numeral 12 in Figs. 2 and 3. Blade or knife 14 is secured to and carried by the cylinder for co-operation with a fixed blade 16 for cleanly severing the continuous strip or web of material 18 at each revolution of the cylinder.

It will be understood that suitable means, not illustrated, are provided for rotating cylinder 12 at a given rotational speed, and that other means are provided for continuously feeding the strip or web of material 18 to the right, that is, into and between knives 14 and 16, at high linear speeds such as, by way of example, at the rate of 500 feet per minute.

The present invention is neither directed to nor concerned with the particular strip feeding means nor with the particular type of rotary cut-off means employed, those illustrated being solely exemplary rather than restrictive in nature.

The linear speed of the sheets severed from the continuous strip is positively and quickly reduced an appreciable amount from the linear speed to which the individual sheets are discharged from the cut-off means, and in order to properly accommodate the severed sheets which, it will be understood, are rapidly discharged from the cut-off means, such sheets are deposited upon one another in echelon relationship with the last sheet uppermost.

With particular reference to Fig. 2, it will be noted that the sheets are deposited onto a supporting surface which comprises a plurality of laterally spaced rotatably mounted feed or slow-down rolls 20, driven, by way of example, by means of chain 22 at peripheral speeds considerably less than the linear speed of web 18.

Figure 4:
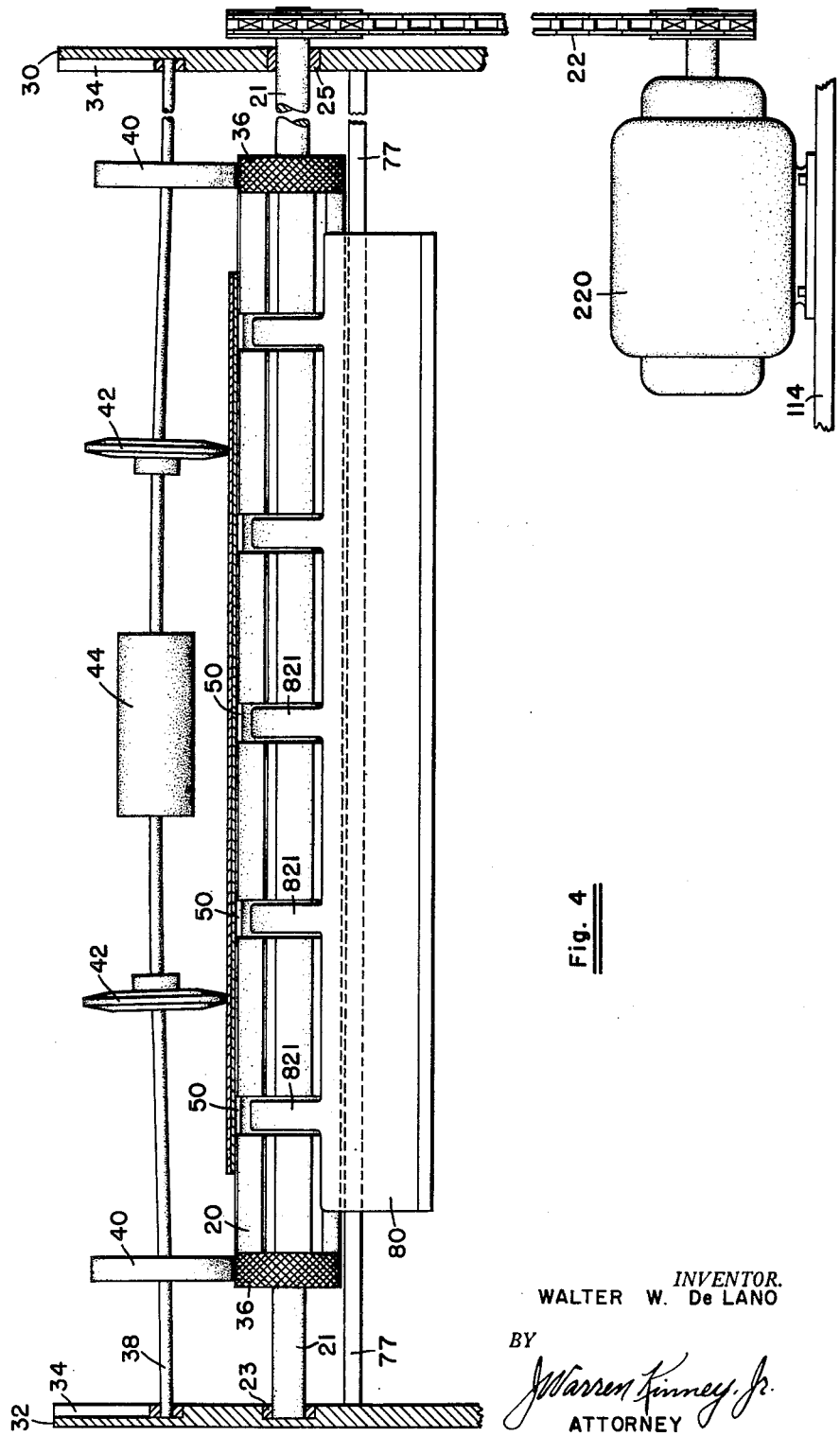
Fig. 4 is a view taken on line 4—4 of Fig. 2.
Figure 7:
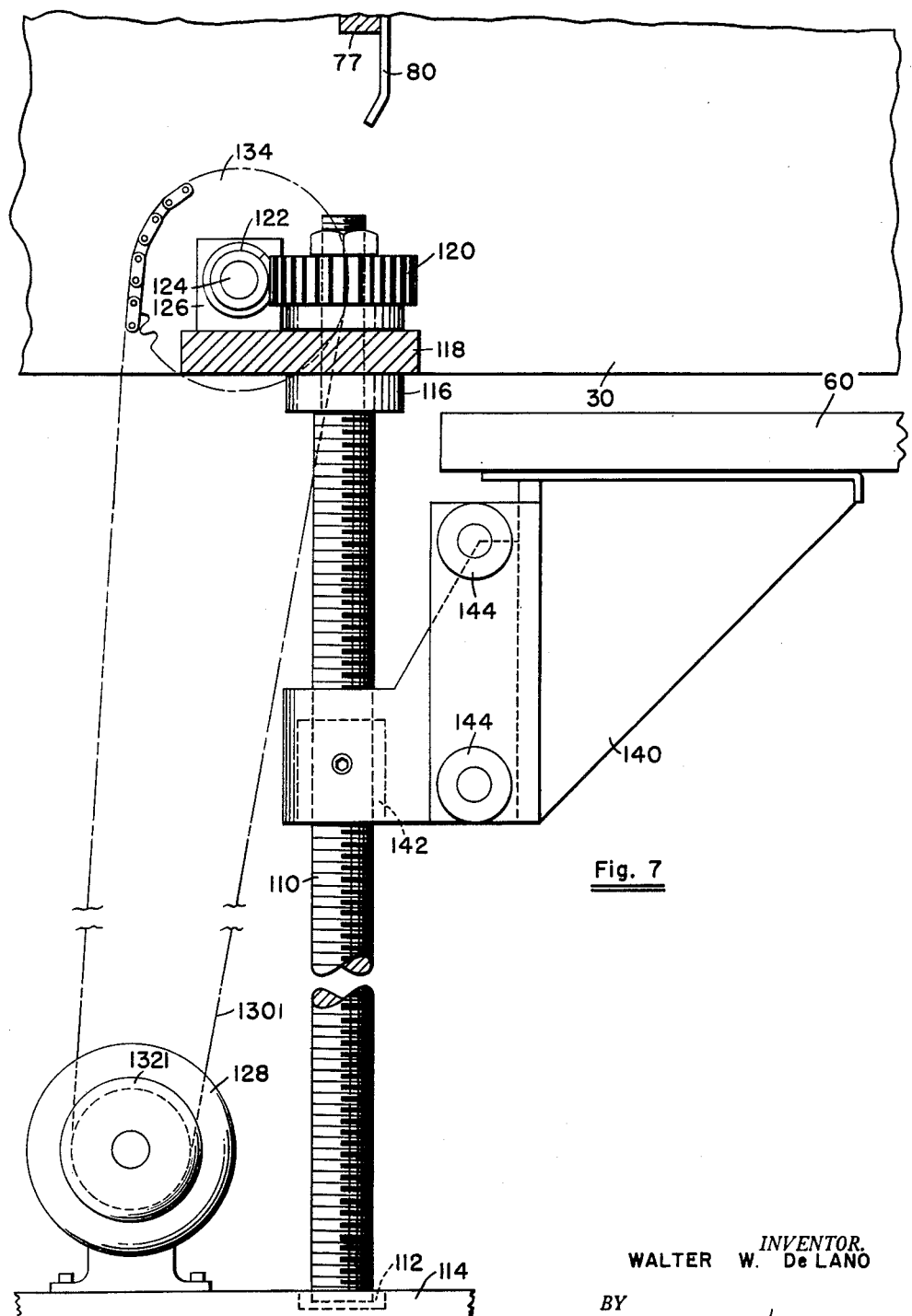
Fig. 7 is an enlarged sectional view of the platform elevating mechanism.
Figure 8:
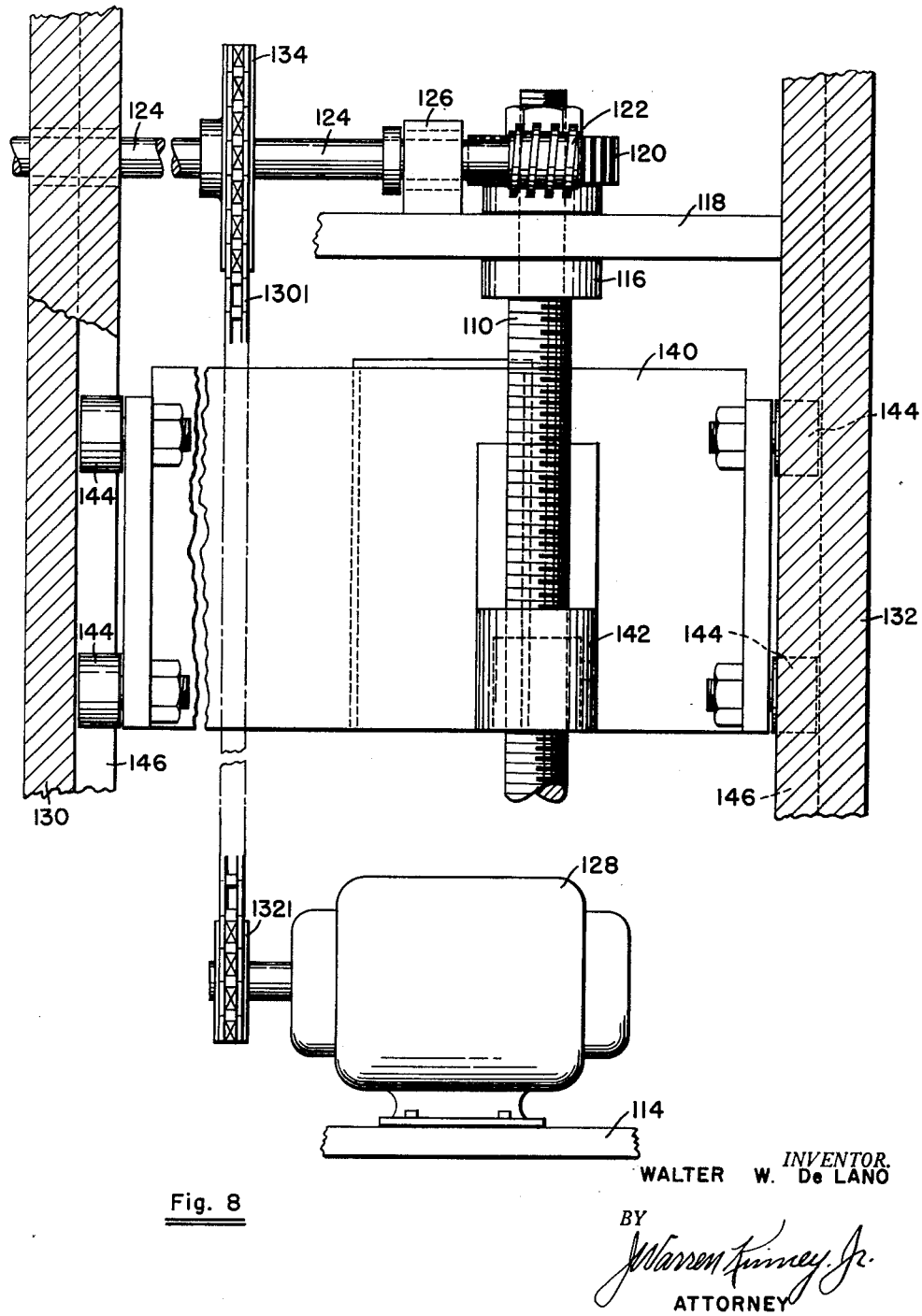
Fig. 8 is a front view of the platform elevating mechanism of Fig. 7, comprising a detail of the present invention.

With reference now to Fig. 1, it will be noted that the device comprises a pair of laterally spaced side members 30 and 32 between which rollers 20 are rotatably disposed in spanning relationship on shafts 21 suitably journaled in members 30 and 32 as at 23 and 25. In Fig. 1 these rollers are concealed from view by the sheet material deposited thereon. In the preferred embodiment of the invention rollers 20 may be fabricated from or covered with any suitable material which will provide a smooth surface having good friction qualities, such as, by way of example, rubber. As best illustrated in Fig. 4, the opposite ends of each of these rollers are provided with knurled outer peripheral portions 36.

A plurality of shaft-end-receptive slots 34 are provided in side members 30 and 32, one above and adjacent the opposite ends of shafts 21.

The opposite ends of a shaft 38 are adapted to be received within the shaft-end-receptive means or slots 34 which comprise a set or pair, for disposing the shaft in spanning relationship between side members 30 and 32 and for locating drive elements 40 secured to and carried by the shaft in contacting, driven relationship with the knurled outer portion 36 of one of rollers 20.

Sheet contacting means such as rollers or disks 42 are secured to and carried by shaft 38 as is a central weighted member 44, the purpose of which is to positively urge and maintain disks 42 in engagement with the upper surface of the echelon sheets for thereby urging the stack of echelon sheets onto the upper surface of the supporting, feed or slow-down rollers 20 for thereby correlating the linear speed of the stack of echelon sheets to the peripheral speed of rollers 20.

In those instances wherein the device is adapted to accommodate sheets of various lengths a roller 20 is preferably provided for each of the various sheet lengths which the device may be called upon to handle. In Fig. 2, seven such rollers have been illustrated, thereby providing a device having maximum flexibility and capable of handling sheet lengths from 17 to 52 inches.

The endmost roller, that is, the one nearest the discharge end of the support surface, comprises a combination support and so-called kick-off roller provided with a plurality of laterally spaced circumferential grooves 50, see Figs. 4, 5 and 6, and a plurality of notches 52 extending longitudinally of, that is, across and at right angles to grooves 50. As best illustrated in Fig. 6, it will be noted that grooves 50 intersect notches 52, and that each groove comprises a rear radial face or edge 84 and a bottom face or edge 85 cut into the material from which the body of the roller is fabricated. The depth of the circumferential grooves exceeds the depth of the notches for a reason hereinafter made apparent.

A platform denoted generally by the numeral 60 is provided beyond the discharge end of the support member, that is, forwardly of the kick-off roll, for providing a surface onto which the sheets may be deposited for vertical stacking.

As best disclosed in Fig. 3, the rear edge of the bottom sheet 62 of the stack of echelon sheets comprising sheets 62, 64, 66, 68 and 70 is adapted to be received within one of the notches 52 of the kick-off roll whereby the rear edge of the lowermost sheet will be contacted by the rear face or edge 84 of the notch and be urged forwardly, that is, to the right, beneath and relative to echelon sheets 64, 66, 68 and 70 by a predetermined distance sufficient to cause the forward end 72 of the lowermost echelon sheet to abuttingly engage rear face 74 of vertical alignment guide denoted generally by the numeral 76.

A stripper plate 80 having a plurality of laterally spaced stripping fingers 821 projecting therefrom is mounted on the discharge side of the kick-off roll with the stripper fingers seated in the circumferential grooves 50 of the kick-off roller with the ends of the fingers located below the bottoms of the grooves 52. Plate 80 may be secured to and carried by element 77, which is carried by side members 30 and 32 which it spans. The relationship of stripper fingers 821 and strip 80 is such as to automatically effect a disengagement of the rear edge of the lowermost of the echelon sheets from the rear face 84 of a notch 52 after the sheet has been advanced a predetermined distance by the kick-off roll for disposing the forward edge of the sheet to contact the vertical alignment guide. In other words, the function of stripper plate 80 and its associated fingers 82 is to automatically disengage the rear edge of the lowermost of the echelon sheets from notch 52 after the sheet has been ejected forwardly and before the rear edge of the notch can exert a downward rather than a forward component to the sheet.

In those instances wherein sheets of various lengths are to be handled, as in the device of Figs. 1 and 2, the side members 30 and 32 may be provided beyond the kick-off means with a plurality of laterally spaced notches 90 for enabling the vertical alignment guide member 76 to be disposed beyond the discharge end of the support member by a dimension approximating the length of the individual sheets to be stacked on platform 60.

With particular reference now to Fig. 2, it will be noted that two shafts 38 have been utilized along with two sets of contact rollers 42. The location of the first shaft has been determined by the length of the sheet being severed from web 18, wherein the spacing of this shaft is such as to preclude contact disk 42 from engaging the uppermost sheet until after that sheet has been severed from web 18. The contact rollers of the first shaft 38 will therefore urge the sheets beneath it onto the various rollers 20, and more particularly onto the third roller above which shaft 38 is disposed. In this manner the linear speed of the last sheet severed is not reduced from the linear speed of web 18 until after it has been severed, thereby precluding any distortion, buckling, or other form of misalignment which would result were the forward motion of the uppermost sheet impeded while connected to the web.

The second shaft 38 is disposed above the last of the support rollers which as hereinabove explained is also a kick-off roll. The primary function of the contacting disks 42 is to positively cause the stack of echelon sheets to assume a linear speed equal to the peripheral speed of rollers and kick-off roll. The linear speed thus imparted to the echelon sheets is considerably slower than the web speed.

With reference now to Fig. 3, it will be noted that in those instances wherein the device is adapted to accommodate sheets of a single length, the sheets severed from web 18 may be deposited in echelon relationship upon a fixed supporting surface 23 over which the stack of echelon sheets may be drawn by reason of the action of kick-off roll 20 and contacting disk 42. As in the previous example, the slow-down means is spaced from the cut-off zone by a dimension at least as great as the overall length of the sheets being severed from the web.

As clearly illustrated in Figs. 2 and 3, the elevation of the charging or intake end of the sheet supporting means is below the cutting edge of fixed knife 16, which edge is preferably to the left of a vertical through the axis of rotation of cutting cylinder 12. Rotation of cylinder 12 causes blade 14 to knock or lay the end of the severed sheet downwardly out of and below the plane of the severed end of the web whereby the severed end of the web, which comprises the forward edge of the next sheet to be severed therefrom, will be advanced over and be laid on top of the previously severed sheet, which it will engage in echelon relationship.

In order to prevent the forward edge of the severed sheets from raising instead of quickly falling onto the previously severed sheet suitable means such as high speed endless belts may be provided above the zone in which the sheets are deposited in echelon relationship. In Fig. 1 these belts are indicated generally by the numerals 79, it being understood that they are driven, by suitable means not illustrated, for advancing their lower reaches at linear speeds at least as great as the linear speed of web 18.

If desired, lay down bars 81 may be secured to rod 82 spanning side members 30 and 32 for gravitationally engaging the uppermost of the echelon sheets which freely slide beneath the bars.

The location of vertical alignment guide 76 is disposed in lateral spaced relationship with forward face of stripper plate 80 by a dimension at least as great as the length of the sheets severed from web 18.

Suitable means are provided for automatically lowering platform 60 as the height of the pile of vertically aligned sheets builds up thereon. If desired, vertical motion may be imparted to platform 60 by means of a vertically disposed lead screw 110, the lower end of which may be suitably rotatably journaled in a thrust bearing 112 carried by bottom plate 114, and the upper end of which may be rotatably journaled as at 116 to a horizontal structural element 118 spanning side walls 30 and 32. Rotary motion may be imparted to the lead screw by means of spur gear 120 engaging worm gear 122 secured to and carried by shaft 124 rotatably journaled in bearing 126 secured to and carried by structural element 118. Rotation of worm 122 may be controlled by an electric motor 128 through chain 1301 and sprockets 1321 and 134.

A platform horn or saddle 140 is secured to a nut 142 which threadably engages lead screw 110. A pair of laterally spaced rollers 144 are adapted to ride in vertical track 146 provided in depending portions 130 and 132 of side members 30 and 32 whereby rotation of lead screw 110 will result in a raising or lowering of the platform saddle or horn 140.

Suitable means, such as, by way of example, an electric eye, may be utilized for controlling the operating characteristics of motor 128. In Fig. 1 members 158 and 160 denote a suitable source of light and a light responsive element, respectively, comprising part of the photoelectric control system. The numeral 164 denotes an aperture in side member 30 through which the beam of light passes.

In those instances wherein the height of the sheets stacked upon the platform does not interrupt the beam of light of the photoelectric control system, motor 128 will not be energized and the platform will remain stationary. However, whenever the height of the stack of sheets on the platform is sufficient to interrupt the light beam, an electrical circuit is closed through suitable means not illustrated for energizing motor 128 for thereby lowering the platform a predetermined amount such as, by way of example, one-half an inch. When the height of severed sheets builds up approximately one-half inch, the motor will be again energized for lowering the platform by another predetermined amount. In this manner the platform height is correlated to the height of the sheets stacked thereon with reference to the axis of the light beam.

With further reference to Fig. 1, it will be noted that the sides of the sheets discharged onto the platform are engaged by and between a pair of laterally spaced guides each including a top leg 170 and a side leg 172. The guides are secured to and suspended from members 174 which project transversely of side members 30 and 32. The spacing of the guides may be set by means of clamping members 176 which slidably engage members 174. As the sheets are discharged forwardly onto the platform their side edges will be accurately guided into vertical alignment with the previously deposited sheets, it already being noted that the forward edges of such sheets will have been disposed in vertical alignment by reason of having contacted guide 76.

From the foregoing it will be noted that the front, side and rear edges of the sheets stacked upon platform 60 will be disposed in vertical alignment without the use of bumpers or joggers heretofore widely used in the industry.

As illustrated in Fig. 2, platform 60 may be of sufficient length to accommodate the longest sheet severed from web 18, it being noted that vertical alignment guide 76 may be disposed above and along the platform as determined by the length of sheets to be stacked.

In the preferred embodiment of the invention two sets of platform supporting horns or saddles 140, one set at opposite ends of the platform, are provided. The operating characteristics of both sets of horns may be synchronized by means of a chain and sprocket drive, not illustrated, wherein sprockets are secured to and carried by those ends of shafts 124 which extend through side member 130. The structural details of each set of the platform supporting horns, mounting and drive mechanisms therefore are substantial duplicates.

Rollers 20 may, if desired, be driven by a separate source of power, such as an electric motor 220, via chain drive 22, or the rollers may be driven directly from the cut-off blade mechanism.

In passing it will be noted that the amount by which the echelon sheets overlap one another is determined by and is a function of the peripheral speed of rollers 20. The greater the speed of these rollers, the greater the degree or amount of overlap of the individual sheets. Uniformly excellent results have been obtained when the amount of overlap of the echelon sheets has approximated six inches when the sheets were 52 inches long.

The echelon relationship of the severed sheets provides such effective reinforcement that paper as thin as .002 inch may be easily and satisfactorily handled by the device.

In the drawings those edges of the sheets stacked upon the platform adjacent stripper plate 80 have been illustrated as being laterally spaced from the plate. Such representation is merely to clearly indicate the rear edge of the sheets which in reality are in actual contact with the forward vertical face of the stripper plate which acts as the alignment means for the rear edge of the sheets stacked upon the platform. As hereinabove stated, the distance between face 74 of alignment guide 76 and the forward face 100 of the stripper plate is substantially equal to the overall length of the severed sheets.

What is claimed is:

1. A stacker for individual sheets severed by rotary cut-off means from a continuous strip of material moving at high linear speed, comprising a stationary support onto which the individual sheets are consecutively discharged in echelon relationship with the last sheet uppermost, a platform beyond said support onto which the sheets are deposited, upper and lower members adjacent the discharge end of said support to engage the uppermost and lowermost of said echelon sheets for advancing the composite stack of echelon sheets over said support, said lower member including means to engage the rear edge of the lowermost of the echelon sheets for advancing said sheet forwardly relative to the other echelon sheets superposed thereon by a predetermined amount for disposing said sheet in substantial vertical alignment with the sheet which preceded it as the lowermost of the echelon sheets.

2. A stacker for individual sheets severed by rotary cut-off means from a continuous strip of material moving at high linear speed, said stacker comprising a stationary support onto which the individual sheets are consecutively discharged in echelon relationship at substantially the same linear speed as the speed of the strip from which they were severed, slow down means including upper and lower members engageable by the echelon sheets for advancing them over said support at a linear rate considerably slower than the linear speed of the continuous strip from which they were severed, said slow down means being located relative to the support whereby the forward edge of the uppermost of the echelon sheets will not engage said slow down means until after the uppermost sheet has been severed from the continuous strip, a platform beyond said support, the lower member of said slow down means located between the discharge end of said support and the forward end of the platform, said lower member including means to engage the rear edge of the lowermost of the echelon sheets for advancing said sheet forwardly relative to the other echelon sheets by a predetermined amount for disposing said sheet in substantial vertical alignment with the sheet which preceded it as the lowermost of the echelon sheets.

3. A stacker for individual sheets severed by rotary cut-off means from a continuous strip of material moving at high linear speed, said stacker comprising a supporting surface defined by a plurality of laterally spaced substantially parallel rollers onto which the individual sheets are discharged in echelon relationship with the last sheet uppermost and at substantially the same linear speed as the speed of the strip from which they were severed, means driving said rollers at a peripheral speed considerably slower than the linear speed of the continuous strip, means engaging the uppermost of the echelon sheets for positively depressing the entire group of echelon sheets onto the support rollers for correlating the linear speed of said sheets to the peripheral speed of said rollers, said means located forwardly of the charging end of the supporting surface whereby the forward edge of the uppermost of the echelon sheets will not be engaged until after the uppermost sheet has been severed from the continuous strip, a platform beyond said support onto which the sheets discharged from the supporting surface are deposited, a vertical alignment guide disposed transversely of the platform, the last of the support rollers including means to engage the rear edge of the lowermost of the echelon sheets for advancing said sheet forwardly beneath and relative to the other echelon sheets by a predetermined amount for disposing the forward edge of said sheet in abutting relationship with said alignment guide and in substantial vertical alignment with the sheets which preceded it as the lowermost of the echelon sheets.

4. A stacker for individual sheets severed by rotary cut-off means from a continuous strip of material moving at high linear speed, comprising a supporting surface onto which the individual sheets are discharged in echelon relationship with the last sheet uppermost, means for imparting a sheet advancing movement to said supporting surface whereby sheets deposited thereon will be given a linear motion at a rate considerably less than the linear speed of the continuous strip, means effective only after the uppermost sheet has been severed from the continuous strip for urging the stack of echelon sheets onto and in driven relationship with said supporting surface, a platform beyond said support onto which the sheets are deposited, and means at the discharge end of said support to engage the rear edge of the lowermost of the echelon sheets for advancing said sheet forwardly beneath and relative to the other echelon sheets superposed thereon by a predetermined distance for disposing said sheet in substantial vertical alignment with the sheet which preceded it as the lowermost of the echelon sheets.

5. A stacker for individual sheets severed by rotary cut-off means from a continuous strip of material moving at high linear speed, said stacker comprising a pair of laterally spaced side members, a plurality of laterally spaced rollers spanning said side members for providing a support surface onto which the individual sheets are discharged in overlapping echelon relationship with the last sheet uppermost and at substantially the same linear speed as the speed of the strip from which they were severed, means driving said rollers at a peripheral speed considerably slower than the linear speed of the continuous strip from which the sheets were severed, a plurality of shaft-end-receptive means provided in the side members above and adjacent the ends of the rollers spanning said members, a shaft the opposite ends of which are receivable in said last mentioned means for spanning said side members, means on said shaft for rotatably engaging and riding upon the stack of echelon sheets supported on said rollers, means for driving said shaft whereby the sheet contacting means thereon will have substantially the same peripheral speed as the supporting rollers, said sheet contacting means being so located with respect to the rotary cut-off means that it will not engage the uppermost echelon sheet until it has been severed from the continuous strip, said supporting rollers and sheet contacting means limiting the linear speed of the echelon sheets to the peripheral speed of said rollers, a platform located between said side members and forwardly of the endmost of the supporting rollers onto which the sheets discharged from the supporting rollers are deposited, a vertical guide above the platform suspended from and spanning the side members, and means spanning the side members adjacent the discharge end of the sheet supporting surface engageable with the rear edge of the lowermost of the echelon sheets for advancing said sheet forwardly beneath and relative to the other echelon sheets by a predetermined amount for disposing the forward edge of said sheet in abutting relationship with said guide and in substantial vertical alignment with the various sheets which preceded it as the lowermost of the echelon sheets.

6. A stacker for individual sheets severed by rotary cut-off means from a continuous strip of material moving at high linear speed, said stacker comprising a pair of laterally spaced side members, a support surface located below the plane of severance of the sheets from the continuous strip, said surface comprising a plurality of driven rolls spanning said members for providing a support onto which the individual sheets are consecutively discharged in overlapping echelon relationship with the last sheet uppermost and at substantially the same linear speed as the speed of the strip from which they were severed, means spanning the side members above said support surface for engaging the stack of echelon sheets, said means spaced from the rotary cut-off means by a dimension such that it will not engage the uppermost echelon sheet until it has been severed from the continuous strip, said support surface and sheet contacting means materially reducing the linear speed of the echelon sheets from the linear speed of the continuous strip, a platform onto which the sheets discharged from the support surface are deposited, said platform located between said side members and forwardly of said support surface, a vertical guide above the platform suspended from and spanning the side members, and driven roller means spanning the side members adjacent the discharge end of the sheet support surface, said means including transversely extending notches adapted to engage the rear edge of the then lowermost of the echelon sheets for advancing that sheet forwardly beneath and relative to the other echelon sheets by a predetermined amount for disposing the forward edge of that sheet in abutting relationship with said guide and in substantial vertical alignment with the various sheets which preceded it as the lowermost of the echelon sheets.

7. A combined creeper delivery and stacker device for sheets severed by rotary cut-off means from a continuous high speed web of material, said device comprising a supporting surface onto which the sheets severed from the web are discharged in echelon relationship with the last sheet uppermost, means for advancing the stack of echelon sheets at a linear rate considerably less than the web speed, a platform beyond said support onto which the sheets are deposited, a rotatable member at the discharge end of said support having transverse notches therein to engage the rear edge of the then lowermost of the echelon sheets for advancing said sheet forwardly beneath and relative to the other echelon sheets superposed thereon by a predetermined distance for disposing said sheet on top of and in substantial vertical alignment with the sheet which preceded it as the lowermost of the echelon sheets.

8. A combined creeper delivery and stacker device for sheets severed by rotary cut-off means from a continuous high speed web of material, said device comprising a supporting surface onto which the sheets severed from the web are discharged in echelon relationship with the last sheet uppermost, means for advancing the stack of echelon sheets at a linear rate considerably less than the web speed, a platform beyond said support onto which the sheets are deposited and kick-off means at the discharge end of said support to engage the rear edge of the lowermost of the echelon sheets for advancing said sheet forwardly beneath and relative to the other echelon sheets superposed thereon by a predetermined distance for disposing said sheet on top of and in substantial vertical alignment with the sheet which preceded it as the lowermost of the echelon sheets, said kick-off means comprising a cylinder having a plurality of laterally spaced circumferential grooves and a longitudinal notch provided therein, said notch including a rear edge engageable with the rear edge of the lowermost of the echelon sheets, and a stripper plate between said cylinder and platform including a plurality of fingers seated in the grooves of the cylinder for automatically releasing the rear edge of the lowermost echelon sheet from the notch.

9. A combined creeper delivery and stacker device for sheets severed by rotary cut-off means from a continuous high speed web of material, said device comprising a supporting surface onto which the sheets severed from the web are discharged in echelon relationship with the last sheet uppermost, a platform beyond said support onto which the sheets are deposited, means for advancing the stack of echelon sheets at a linear rate considerably less than the web speed and for advancing the lowermost of the echelon sheets forwardly beneath and relative to the other echelon sheets superposed thereon by a predetermined distance for disposing said sheet on top of and in substantial vertical alignment with the sheet which preceded it as the lowermost of the echelon sheets, said means comprising a combination slow-down, kick-off cylinder having a plurality of laterally spaced circumferential grooves and a longitudinal notch provided therein over which the stack of echelon sheets passes, said notch including a rear edge engageable with the rear edge of the lowermost of the echelon sheets, a stripper plate between said cylinder and platform including a plurality of fingers seated in the grooves of the cylinder for automatically disengaging the rear edge of the lowermost echelon sheet from the notch after the sheet has been advanced said predetermined amount, and rollers above the stack of echelon sheets for positively depressing the entire stack of sheets onto said cylinder, and means for driving said cylinder and rollers.

10. A combined creeper delivery and stacker device for sheets severed by rotary cut-off means from a continuous high speed web of material, said device comprising a supporting surface onto which the sheets severed from the web are discharged in echelon relationship with the last sheet uppermost, means for advancing the stack of echelon sheets at a linear rate considerably less than the web speed, a platform beyond said support onto which the sheets are deposited, kick-off means at the discharge end of said support to engage the rear edge of the lowermost of the echelon sheets for advancing said sheet forwardly beneath and relative to the other echelon sheets superposed thereon by a predetermined distance for disposing said sheet on top of and in substantial vertical alignment with the sheet which preceded it as the lowermost of the echelon sheets, a vertical alignment guide spaced forwardly of said kick-off means and above said platform, said guide engageable by the forward edge of the individual sheets advanced by the kick-off means, said kick-off means comprising a cylinder having a plurality of laterally spaced circumferential grooves and a longitudinal notch provided therein, said notch including a rear edge engageable with the rear edge of the lowermost of the echelon sheets, and a stripper plate between said cylinder and platform including a plurality of fingers seated in the grooves of the cylinder for automatically releasing the rear edge of the lowermost echelon sheet from the notch and disposing said rear edge in abutting relationship with the forward face of said stripper plate, wherein the distance between the forward face of the stripper plate and said alignment guide are substantially equal to the overlength of the sheets being stacked.

11. The method of continuously stacking, onto the uppermost sheet of a vertically aligned stack of similar sheets, the lowermost of a plurality of individual, flexible sheets advanced in overlapping echelon relationship onto said stack, which method comprises the steps of engaging the rear edge of only the then lowermost of the echelon sheets, and of then advancing said sheet by its rear edge over the uppermost sheet of the stack, a predetermined distance forwardly of, beneath, and relative to the other higher echelon sheets.

References Cited in the file of this patent

UNITED STATES PATENTS

| Number | Name | Date |
|---|---|---|
| 1,011,046 | Freeman | Dec. 5, 1911 |

(Other references on following page)

UNITED STATES PATENTS

| Number | Name | Date |
|---|---|---|
| 1,281,014 | Huneke | Oct. 8, 1918 |
| 1,434,014 | La Bombard | Oct. 31, 1922 |
| 1,545,910 | Maxson | July 14, 1925 |
| 1,545,912 | Maxson | July 14, 1925 |
| 2,097,013 | Bartholdt | Oct. 26, 1937 |
| 2,138,995 | Belluche | Dec. 6, 1938 |
| 2,261,972 | Matthews | Nov. 11, 1941 |
| 2,391,170 | Labombarde | Dec. 18, 1945 |
| 2,460,876 | Dager | Feb. 8, 1949 |
| 2,525,311 | Peyrebrune | Oct. 11, 1950 |